United States Patent
Ito

(10) Patent No.: US 12,235,115 B2
(45) Date of Patent: Feb. 25, 2025

(54) INFORMATION PROCESSING DEVICE, COMPUTER-READABLE RECORDING MEDIUM STORING INFORMATION PROCESSING PROGRAM, AND INFORMATION PROCESSING METHOD

(71) Applicant: Fujitsu Limited, Kawasaki (JP)

(72) Inventor: Yuto Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 18/152,793

(22) Filed: Jan. 11, 2023

(65) Prior Publication Data

US 2023/0349703 A1   Nov. 2, 2023

(30) Foreign Application Priority Data

Apr. 28, 2022   (JP) .................................. 2022-075025

(51) Int. Cl.
*G01C 21/34*   (2006.01)

(52) U.S. Cl.
CPC ................. *G01C 21/3415* (2013.01)

(58) Field of Classification Search
CPC .................................................. G01C 21/3415
See application file for complete search history.

(56) References Cited

U.S. PATENT DOCUMENTS

| 11,619,951 | B2* | 4/2023 | Alonso-Mora | G06Q 10/06311 701/26 |
| 2015/0356483 | A1* | 12/2015 | Saliba | G06F 16/2237 705/7.24 |
| 2017/0328725 | A1* | 11/2017 | Schlesinger | G01C 21/3438 |

(Continued)

FOREIGN PATENT DOCUMENTS

| EP | 3879466 A1 | 9/2021 |
| JP | 2021-111237 A | 8/2021 |
| JP | 2021-165196 A | 10/2021 |

OTHER PUBLICATIONS

Toth, Paolo et al., "Models, relaxations and exact approaches for the capacitated vehicle routing problem", Discrete Applied Mathematics, Elsevier, Amsterdam, NL, vol. 123, No. 1-3, Nov. 15, 2002, pp. 487-512, XP027296750.

Zhang, Haifei et al., "Review of Vehicle Routing Problems: Models, Classification and Solving Algorithms", Archives of Computational Methods in Engineering, Springer Netherlands, Dordrecht, vol. 29, No. 1, Apr. 19, 2021, pp. 195-221, XP037654687.

(Continued)

*Primary Examiner* — Ramsey Refai

(74) *Attorney, Agent, or Firm* — Fujitsu Intellectual Property Center

(57) ABSTRACT

An information processing device of: generating first routes satisfying a first condition; calculating a first index of each node based on a cost of each edge; generating a second route arriving at each node from a starting point and satisfying a second condition; generating a third route satisfying the second condition by adding the edge to the second route; calculating a second index being a difference between a total value of the first index and the cost of the second and third routes; updating the second route when the second index of the third route is smaller than the second index of the second route; excluding the edge having not contributed to the updating more than a predetermined number of times; and outputting a route with the smallest second index, the first index representing a degree of reduction of the cost in a linearly relaxed problem of the routing problem.

9 Claims, 16 Drawing Sheets

(56) References Cited

U.S. PATENT DOCUMENTS

2018/0268371 A1 9/2018 Van Hentenryck et al.
2021/0319371 A1 10/2021 Ito

OTHER PUBLICATIONS

Extended European Search Report dated Sep. 25, 2023 for corresponding European Patent Application No. 23150022.4, 11 pages.

* cited by examiner

FIG. 2

```
FOR EACH NODE i (i = 0 TO n),
OPTIMUM ROUTE FOR REDUCING TOTAL COST AMONG ROUTES STARTING FROM DEPOT (NODE 0)
AND REACHING NODE i (path[i]) IS CONSIDERED.

NUMBER OF ITERATIONS ← 0
path[0] ← [0], path[i≠0] ← []

while (NUMBER OF ITERATIONS REACHES SPECIFIED VALUE)
    for  EDGE (i, j)
        ROUTE[0, ..., i, j] (CALLED path_temp[j]) OBTAINED BY ADDING j TO ROUTE OF path[i] IS CONSIDERED,
        AND IF path_temp[j] IS BETTER ROUTE FOR REDUCING TOTAL COST THAN ALREADY OBTAINED path[j], UPDATE IS
        PERFORMED AS path[j] ← path_temp[j]

NUMBER OF ITERATIONS ← NUMBER OF ITERATIONS + 1 path[0] = [0, ..., 0] IS SET AS GENERATED ROUTE
```

FIG. 4

|  | DEPOT (NODE 0) | NODE 1 | NODE 2 | ... |
|---|---|---|---|---|
| DEPOT (NODE 0) | - | 3 km/10 min | 4.5km/15 min | ... |
| NODE 1 | 3 km/10 min | - | 1.5km/5 min | ... |
| NODE 2 | 4.5km/15 min | 1.5km/5 min | - | ... |
| ... | ... | ... | ... | ... |

FIG. 5

| TRANSPORT SOURCE | TRANSPORT DESTINATION | DEMAND |
|---|---|---|
| DEPOT (NODE 0) | NODE 1 | 5kg |
| DEPOT (NODE 0) | NODE 2 | 3kg |
| NODE 2 | DEPOT (NODE 0) | 2kg |
| ... | ... | ... |

FIG. 6

|  | EARLIEST ARRIVAL TIME | FINAL ARRIVAL TIME |
|---|---|---|
| DEPOT (NODE 0) | - | 20:00 |
| NODE 1 | 17:00 | 19:00 |
| NODE 2 | 18:00 | 19:30 |
| ... | ... | ... |

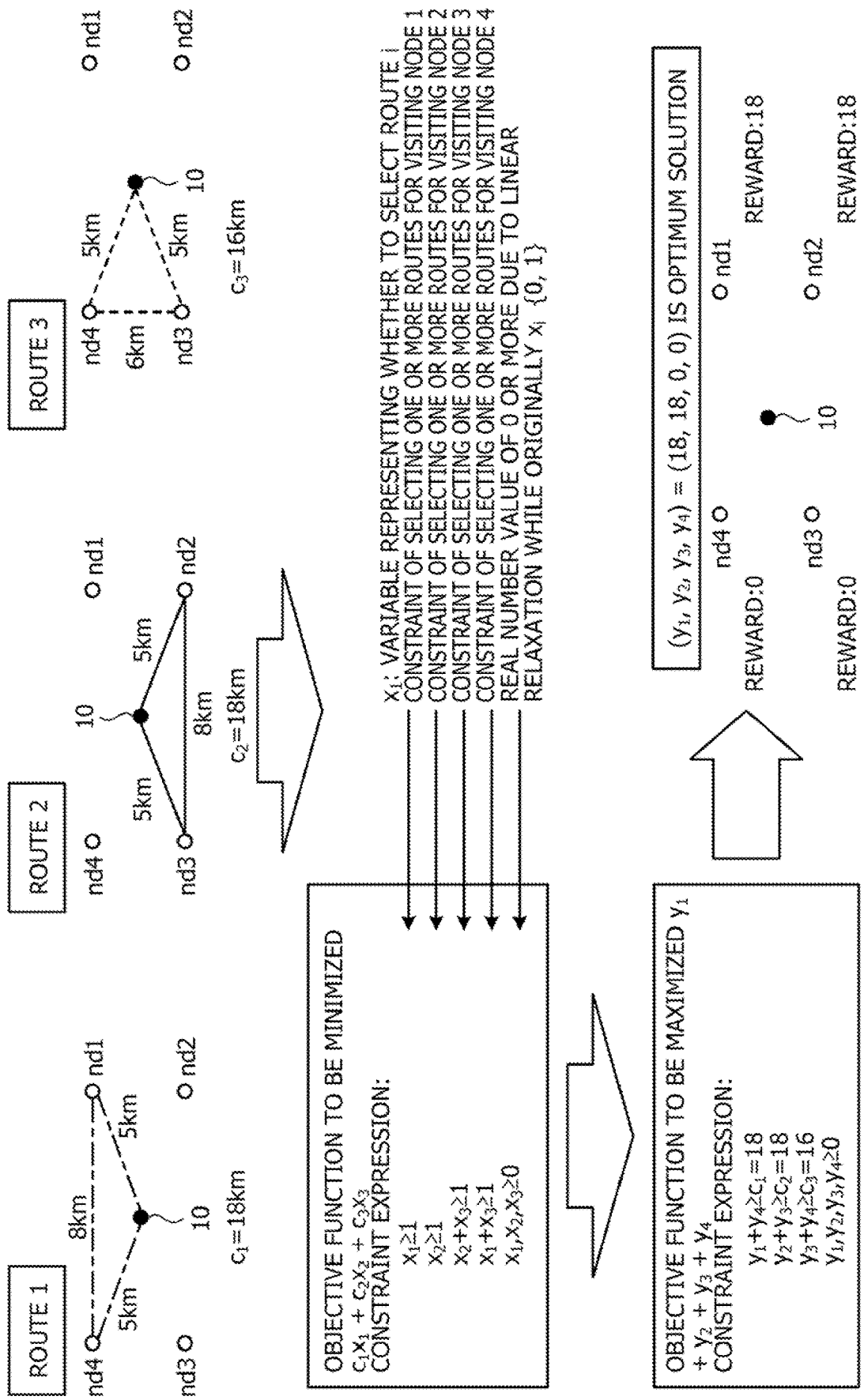

FIG. 10

```
FOR EACH NODE i (i = 0 TO n),
ROUTE WITH MINIMUM REDUCED COST AMONG ROUTES STARTING FROM DEPOT (NODE 0)
AND REACHING NODE i (path[i]) IS CONSIDERED NUMBER OF ITERATIONS ← 0
path[0] ← [0], path[i≠0] ← []

while (NUMBER OF ITERATIONS REACHES SPECIFIED VALUE)
    for EDGE (i, j) {SET OF ALL EDGES}
        ROUTE[0, ..., i, j] (CALLED path_temp[j]) OBTAINED BY ADDING j TO ROUTE OF path[i] = [0, ..., i] IS CONSIDERED,
        AND IF path_temp[j] IS ROUTE WITH REDUCED COST SMALLER THAN REDUCED COST OF ALREADY OBTAINED
        path[j], UPDATE IS PERFORMED AS path[j] ← path_temp[j] (LIMITED TO CASE WHERE path_temp[j] SATISFIES
        CONDITION OF PROBLEM)

NUMBER OF ITERATIONS ← NUMBER OF ITERATIONS + 1 path[0] = [0, ..., 0] IS SET AS GENERATED ROUTE
```

FIG. 12

```
FOR EACH NODE i (i = 0 TO n),
ROUTE WITH MINIMUM REDUCED COST AMONG ROUTES STARTING FROM DEPOT (NODE 0)
AND REACHING NODE i (path[i]) IS CONSIDERED NUMBER OF ITERATIONS ← 0
path[0] ← [0], path[i≠0] ← []

num_times_without_update[(i,j)] ← 0   (FOR ALL EDGES (i, j))

while (NUMBER OF ITERATIONS REACHES SPECIFIED VALUE)
    for  EDGE (i, j) {SET OF EDGES (i, j) SATISFYING num_times_without_update[i, j] Thres}
        ROUTE[0, ..., i, j] (CALLED path_temp[j]) OBTAINED BY ADDING j TO ROUTE OF path[i] = [0, ..., i] IS CONSIDERED
        if (path_temp[j] IS BETTER ROUTE FOR REDUCING TOTAL COST THAN ALREADY OBTAINED path[j]) AND
           (path_temp[j] SATISFIES CONDITION OF PROBLEM)
             UPDATE IS PERFORMED AS path[j] ← path_temp[j]
        else
             num_times_without_update[i, j] IS INCREMENTED BY 1
    NUMBER OF ITERATIONS ← NUMBER OF ITERATIONS + 1 path[0] = [0, ..., 0] IS SET AS GENERATED ROUTE
```

FIG. 13
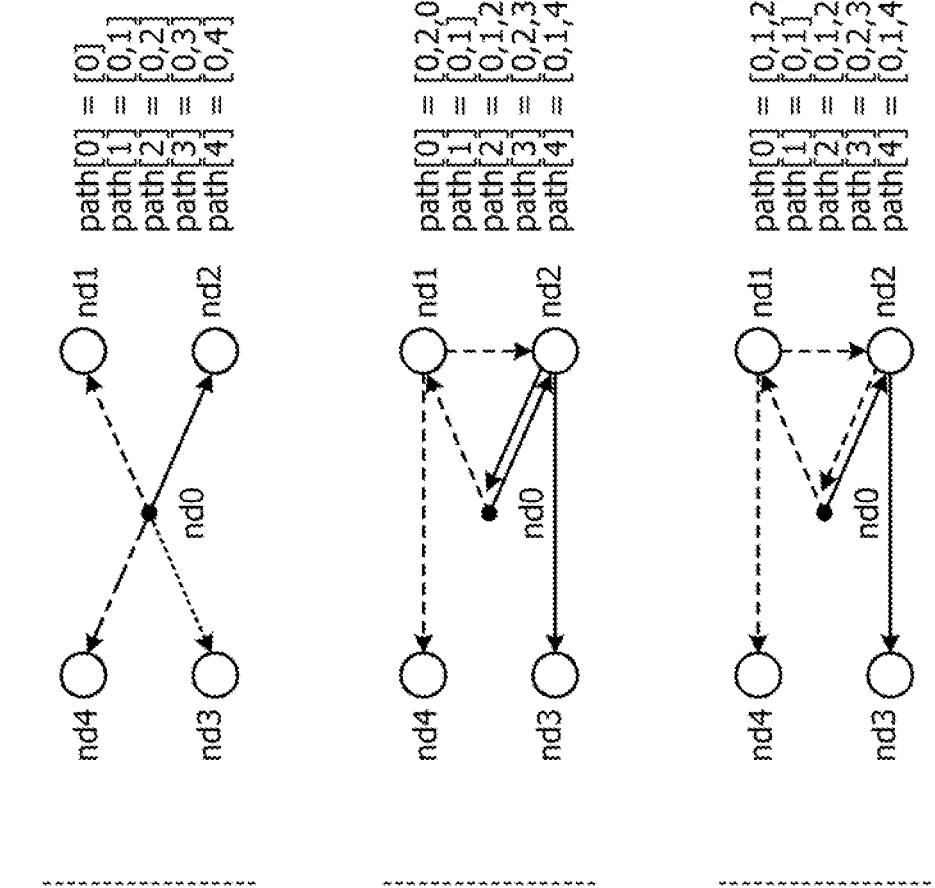
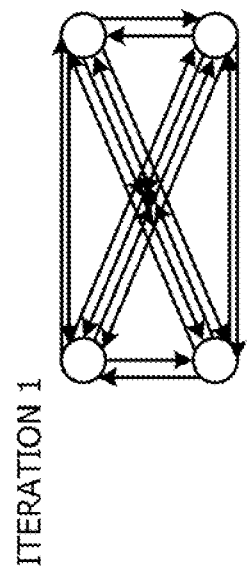

INFORMATION PROCESSING DEVICE, COMPUTER-READABLE RECORDING MEDIUM STORING INFORMATION PROCESSING PROGRAM, AND INFORMATION PROCESSING METHOD

CROSS-REFERENCE TO RELATED APPLICATION

This application is based upon and claims the benefit of priority of the prior Japanese Patent Application No. 2022-75025, filed on Apr. 28, 2022, the entire contents of which are incorporated herein by reference.

FIELD

The embodiments discussed herein are related to an information processing device, a non-transitory computer-readable storage medium storing an information processing program, and an information processing method.

BACKGROUND

One of combinatorial optimization problems is a vehicle routing problem (VRP). For example, in the VRP, it is considered that a plurality of transporter vehicles that stands by at a specific facility called a depot transports cargo from the depot to a transport destination, which is, for example, a customer location, and returns to the depot again, or transports the cargo at the customer location to the depot. In the following descriptions, the transporter vehicle will be referred to as a "vehicle". The customer location will be referred to as a "node" or "nd". Furthermore, the depot may be referred to as a "node 0" or "nd0".

Examples of given data for the VRP include the number of nodes, a travel time of a vehicle to travel between nodes, an amount of cargo that needs to be transported from the depot to each node (or from each node to the depot), a time period during which a vehicle may visit each node, the maximum loading capacity of each vehicle, a cost associated with operation of each vehicle for a certain period of time, and the like. Note that the cost is not limited to monetary items such as a manpower cost and a vehicle usage fee needed at the time of operating the vehicle, but is an index that indicates a load needed for delivery. In the following descriptions, the amount of cargo that needs to be transported will be referred to as "demand". The time period during which the vehicle may visit each node will be referred to as a "time window".

The VRP is a problem of finding a route of each vehicle to minimize the sum of costs of each vehicle when the data described above is given.

The route of each vehicle includes information regarding which node the vehicle is to visit at what time, and information regarding the amount of cargo to be transported to each node (or from each node) by the vehicle. In the following descriptions, the amount of cargo transported to each node (or from each node) visited by the vehicle will be referred to as "supply".

FIG. 1 is a diagram for explaining routes of vehicles. The example illustrated in FIG. 1 includes a depot 10 and nodes 1 to 12 (nd1 to nd12). In descriptions of FIG. 1, illustration of a time at which a vehicle visits a node and supply is omitted. For example, a route of a vehicle 1 is assumed to be a route Ro1, a route of a vehicle 2 is assumed to be a route Ro2, and a route of a vehicle 3 is assumed to be a route Ro3.

The route Ro1 is a route through which the vehicle 1 visits the depot 10 and nd1 to nd4. The route Ro2 is a route through which the vehicle 2 visits the depot 10 and nd5 to nd8. The route Ro3 is a route through which the vehicle 3 visits the depot 10 and nd9 to nd12.

For example, a strategy for solving the VRP includes a step (step 1) of generating a route and a step (step 2) of selecting a route. In step 1, as many routes as possible that satisfy conditions of the problem are generated for each vehicle. The time window and conditions for the maximum loading capacity are set as the conditions of the problem.

In step 2, from among the routes generated in step 1, a set of routes that satisfies the demand of all the nodes and minimizes the sum of costs of each route, which is the total cost, is selected. For example, the processing of step 2 is executed by an optimization device such as an Ising machine.

Examples of an existing method of generating an optimum route candidate for reducing the total cost include a shortest route search method. FIG. 2 is a diagram for explaining an algorithm of the existing shortest route search method. Furthermore, a part surrounded by a broken line in FIG. 2 indicates one iteration. According to the shortest route search method, the following process is performed in each iteration. It is assumed that the tentative optimum route among routes starting from the depot and reaching each node has already been obtained in the previous iteration. Edges between the individual nodes are sequentially scanned, and it is determined whether a better route is obtained by adding the edge to the tentative optimum route, and if the better route is obtained, the route to which the edge has been added is updated as a tentative optimum route. This iteration is repeated a plurality of times, and the latest updated optimum route among the routes returning to the depot is output as a route candidate.

Examples of the related art include: Japanese Laid-open Patent Publication No. 2021-165196; and Japanese Laid-open Patent Publication No. 2021-111237.

SUMMARY

According to an aspect of the embodiments, there is provided an information processing device including: a memory; and a processor coupled to the memory, the processor being configured to perform processing including: generating a plurality of first routes that satisfies a first condition out of a plurality of conditions included in a vehicle routing problem; calculating a first index of each of nodes on a basis of a cost of each edge between each of the nodes of the first route; generating, as an optimum route, a second route that arrives at each of the nodes from a starting point and satisfies a second condition out of the plurality of conditions by combining the edge; generating a third route that satisfies the second condition by adding the edge to the second route; calculating, for each route of the second rote and the third route, a second index that is a difference between a total value of the first index and the cost of the each route; updating the optimum route when the second index of the third route is smaller than the second index of the second route that arrives at a same node as the third route; excluding the edge that has not contributed to the updating of the optimum route equal to or more than a predetermined number of times from a target to be added to each route; and outputting a route with the smallest second index as a route candidate by repeating the adding of the edge to the optimum route, the calculating of the second index, and the updating of the optimum route until the route returns to the starting point, wherein the first index includes an index that represents a degree of reduction of the cost in a linearly relaxed problem of the vehicle routing problem.

The object and advantages of the invention will be realized and attained by means of the elements and combinations particularly pointed out in the claims.

It is to be understood that both the foregoing general description and the following detailed description are exemplary and explanatory and are not restrictive of the invention.

TECHNICAL PROBLEM

Brief Description of Drawings

FIG. 2 is a diagram for explaining an algorithm of an existing shortest route search method;

FIG. 4 is a diagram illustrating exemplary data stored in distance/travel time data 131 according to the first embodiment;

FIG. 5 is a diagram illustrating exemplary data stored in demand data 132 according to the first embodiment;

FIG. 6 is a diagram illustrating exemplary data stored in time window data 133 according to the first embodiment;

FIG. 9 is a diagram illustrating exemplary calculation of rewards according to the first embodiment;

FIG. 10 is a diagram for explaining the algorithm of the shortest route search method for finding a route with the minimum reduced cost;

FIG. 12 is a diagram for explaining an algorithm of the shortest route search method according to the first embodiment;

FIG. 13 is a diagram for explaining exclusion of edges that have not contributed to a route update according to the first embodiment;

DESCRIPTION OF EMBODIMENTS

However, according to the shortest route search method, the number of edges increases by the square of the number of nodes when the number of nodes increases, whereby a processing time for one iteration part increases and a time needed for the optimization device to select an optimum route also increases.

In one aspect, an object of the embodiments is to provide an information processing device, an information processing program, and an information processing method capable of reducing the time needed for the optimization device to select an optimum route.

Hereinafter, embodiments of an information processing device, an information processing program, and an information processing method according to the present disclosure will be described in detail with reference to the drawings. Note that the embodiments do not limit the present disclosure. Furthermore, the individual embodiments may be appropriately combined within a range without inconsistency.

First Embodiment

[Functional Configuration of Information Processing Device 100]

Figure 1:
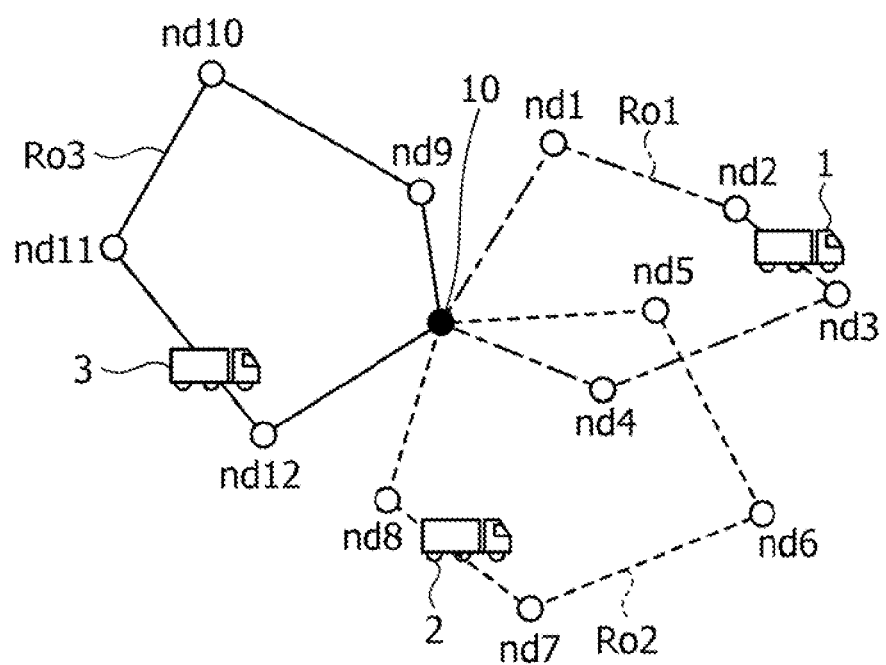
FIG. 1 is a diagram for explaining routes of vehicles.
Figure 3:
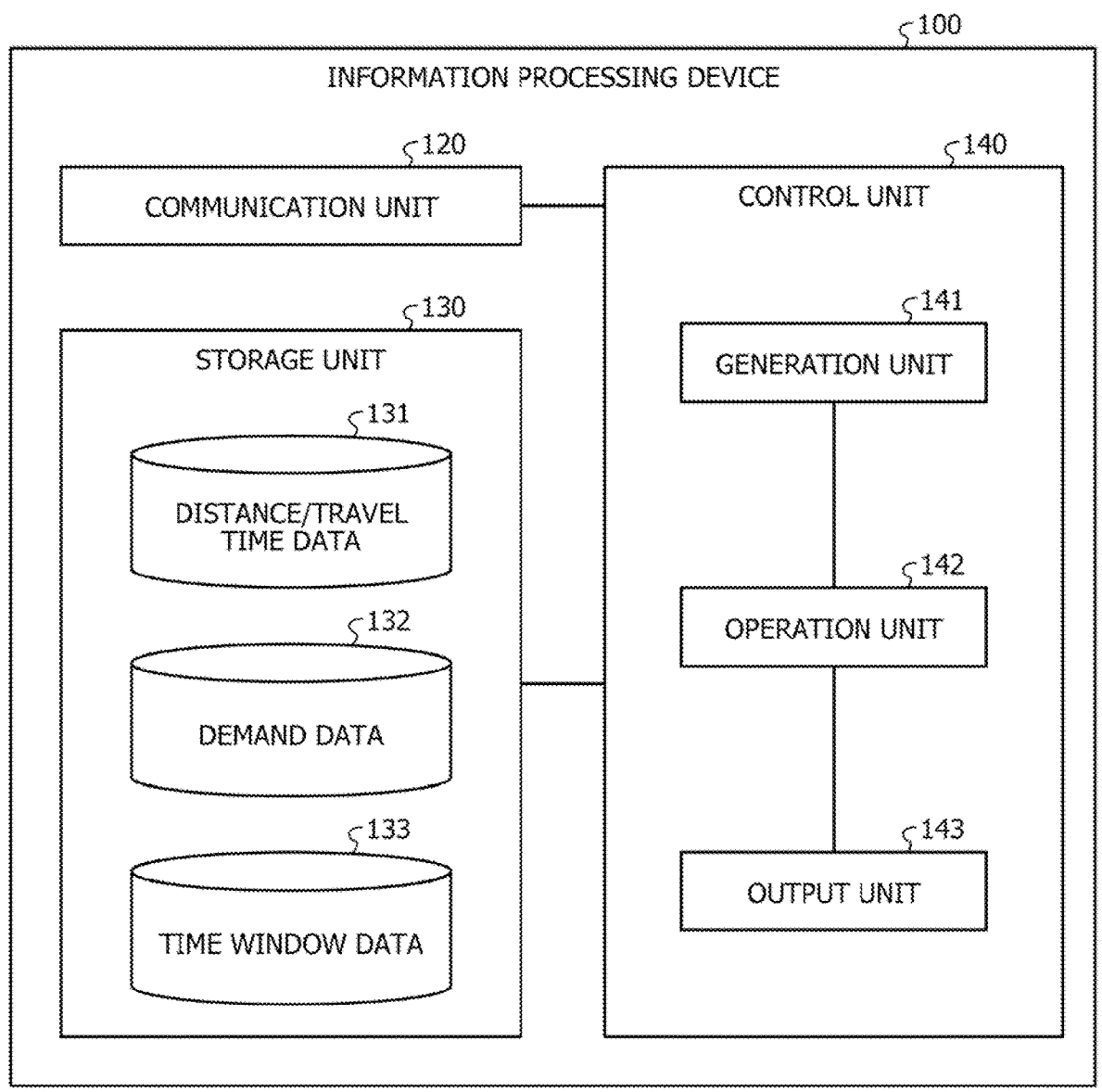
FIG. 3 is a diagram illustrating an exemplary configuration of an information processing device 100 according to a first embodiment.

Next, a functional configuration of an information processing device 100 serving as an execution subject of the present disclosure will be described. The information processing device 100 is an optimization device for selecting an optimum route in a VRP. FIG. 3 is a diagram illustrating an exemplary configuration of the information processing device 100 according to a first embodiment. As illustrated in FIG. 3, the information processing device 100 includes a communication unit 120, a storage unit 130, and a control unit 140.

The communication unit 120 is, for example, a processing unit that controls communication with another information processing device via a network 50, and is, for example, a communication interface such as a network interface card.

The storage unit 130 is an exemplary storage device that stores various types of data and programs to be executed by the control unit 140, and is, for example, a memory, a hard disk, or the like. The storage unit 130 stores distance/travel time data 131, demand data 132, time window data 133, and the like.

The distance/travel time data 131 stores, for example, data regarding a distance between nodes including a depot and a travel time of a vehicle between each of the nodes. FIG. 4 is a diagram illustrating exemplary data stored in the distance/travel time data 131 according to the first embodiment. As illustrated in FIG. 4, the distance/travel time data 131 stores, for example, a distance and a travel time of the vehicle for each of the nodes. For example, the example of FIG. 4 indicates that a distance between a depot and a node 1 is 3 kilometers (km) and the travel time of the vehicle is 15 minutes. Note that, although only nodes up to a node 2 are illustrated in the example of FIG. 4, the distance/travel time data 131 may store data of a node 3 onward. Furthermore, the data stored in the distance/travel time data 131 may be either the distance between each of the nodes or the travel time of the vehicle.

The demand data 132 stores, for example, data regarding an amount of cargo that needs to be transported to each node including the depot. FIG. 5 is a diagram illustrating exemplary data stored in the demand data 132 according to the first embodiment. As illustrated in FIG. 5, the demand data 132 stores, for example, an amount of cargo that needs to be transported from a transport source to a transport destination. For example, the example of FIG. 5 indicates that the amount of cargo that needs to be transported from the depot to the node 1 is 5 kilograms (kg). Note that the amount of cargo stored in the demand data 132 may be in another unit, such as the number of packages. Furthermore, although the example of FIG. 5 illustrates demand for only three nodes, the demand data 132 may store data for more nodes.

The time window data 133 stores, for example, data regarding a time period during which each node including the depot may be visited. FIG. 6 is a diagram illustrating exemplary data stored in the time window data 133 according to the first embodiment. As illustrated in FIG. 6, the time window data 133 stores, for example, the earliest arrival time and the final arrival time of each node including the depot. For example, the example of FIG. 6 indicates that the node 1 may be visited between 17:00 and 19:00. For example, it is indicated that there is a restriction that the target node may only be visited during the time period between the earliest arrival time and the final arrival time. Furthermore, it is indicated that, since the depot is a starting point, there is no earliest arrival time and there is a restriction that the depot needs to be returned by the final arrival time, which is 20:00 in the example of FIG. 6. Note that, although only nodes up to the node 2 are illustrated in the example of FIG. 6, the time window data 133 may store data of the node 3 onward.

Note that the various types of information described above stored in the storage unit 130 are merely examples, and the storage unit 130 may store various types of information other than the information described above.

Returning to the descriptions of FIG. 3, the control unit 140 is a processing unit that takes overall control of the information processing device 100, and is, for example, a processor or the like. The control unit 140 includes a generation unit 141, an operation unit 142, and an output unit 143. Note that each of the processing units is an exemplary electronic circuit included in a processor, or an exemplary process to be executed by the processor.

The generation unit 141 generates, for example, a plurality of first routes that satisfy a first condition out of a plurality of conditions included in the VRP. Furthermore, the generation unit 141 combines edges between the individual nodes of the first route, for example, to generate a second route that arrives at each node from the starting point and satisfies a second condition out of the plurality of conditions as a tentative optimum route. Moreover, the generation unit 141 adds an edge to the generated second route, for example, to generate a third route that satisfies the second condition. Then, the generation unit 141 repeats the edge addition to the optimum route until the generated route returns to the starting point. Note that the plurality of conditions, the first condition, and the second condition included in the VRP indicate, for example, various restrictions in the VRP, such as the maximum loading capacity of the vehicle, the amount of cargo that needs to be transported to each node, and the time period during which each node may be visited.

Furthermore, the generation unit 141 generates an objective function expressed by the following expression (1), for example.

[Expression 1]

OBJECTIVE FUNCTION: $\Sigma_{r \in R} C_r x_r$ (1)

In the expression (1), r represents a route index, R represents a route set, and $C_r$ represents a cost of a route r. Furthermore, $x_r$ represents a variable indicating whether or not the route r is selected by 0 or 1, and it is indicated that the route r is not selected when $x_r = 0$ whereas the route r is selected when $x_r = 1$.

The operation unit 142 calculates a reward of each node on the basis of a cost of each of the edges between each of the nodes of the first route generated by the generation unit 141, for example. The calculation of the reward in the shortest route search method will be described later. Furthermore, the operation unit 142 calculates reduced costs of the second route and the third route generated by the generation unit 141 on the basis of the cost and the calculated reward, for example. The reduced cost will also be described later.

Furthermore, in a case where the reduced cost of the third route is smaller than the reduced cost of the second route that arrives at the same node as the third route, for example, the operation unit 142 updates the optimum route to the third route. Note that, in a case where there is a plurality of third routes with the reduced cost smaller than that of the second route that arrives at the same node, the optimum route may be updated to the third route with the lowest reduced cost among them. For example, when a route to ultimately return to the depot, such as a route with a spare vehicle loading capacity, is generated other than the route with the lowest reduced cost, for example, although it may ultimately be the optimum route, a large number of routes need to be kept retained. Moreover, since the number of routes to be processed increases accordingly, the processing time becomes longer, and it takes time to select the optimum route.

Furthermore, the edges that have not contributed to the update of the optimum route equal to or more than a predetermined number of times are controlled to be excluded from the targets to be added to each route. As a result, the processing time for the excluded edges may be reduced in the shortest route search method, whereby it becomes possible to reduce the time needed for the information processing device 100 to select the optimum route. Note that the operation unit 142 also repeats the calculation of the reduced cost of the generated route and the update of the optimum route until the route generated by the generation unit 141 returns to the starting point.

Note that the operation unit 142 uses the objective function generated by the generation unit 141 and a constraint expression expressed by the following expression (2) to calculate a value of $x_r$ that minimizes the value of the objective function while satisfying the constraint expression, and selects an optimum set of routes from the route set.

[Expression 2]

CONSTRAINT EXPRESSION: $\Sigma_{r \in R} S_{r,i} x_r \geq D_i$ (2)

In the expression 2, i represents a node index, $D_i$ represents demand at a node i, and $S_{r,i}$ represents supply at the node i of the route r.

The output unit 143 outputs, for example, the optimum route to return to the starting point, which is generated by the generation unit 141 and updated by the operation unit 142, as a route candidate. Note that a plurality of optimum routes is retained as route candidates, the output unit 143 may select and output the route with the lowest reduced cost as a route candidate. Note that the data output by the operation unit 142 is, for example, only a bit string representing which route has been selected. Accordingly, the output unit 143 combines the bit string and the generated route data, for example, and outputs the selected route data as a route candidate.

[Function Details]

Figure 7:
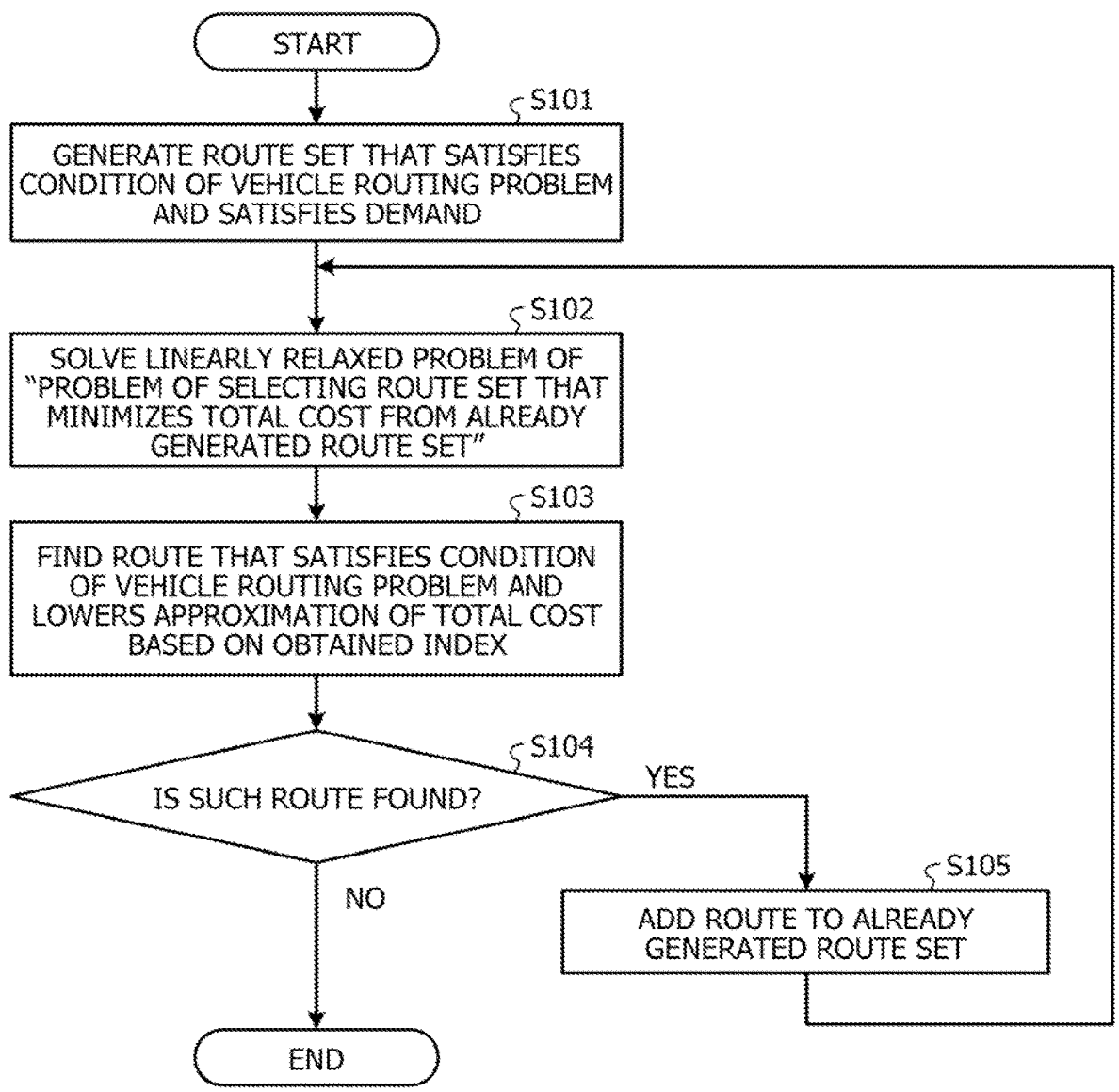
FIG. 7 is a flowchart illustrating an exemplary flow of a route generation process according to the first embodiment.

Next, a route generation process in the VRP to be executed by the information processing device 100 will be more specifically described. FIG. 7 is a flowchart illustrating an exemplary flow of the route generation process according to the first embodiment.

First, the information processing device 100 generates a set of routes that satisfies a predetermined condition of the VRP and satisfies the demand (step S101). Note that the predetermined condition of the VRP indicates, for example, various restrictions in the VRP, such as the maximum loading capacity of the vehicle, the amount of cargo that needs to be transported to each node, and the time period during which each node may be visited.

Figure 8:
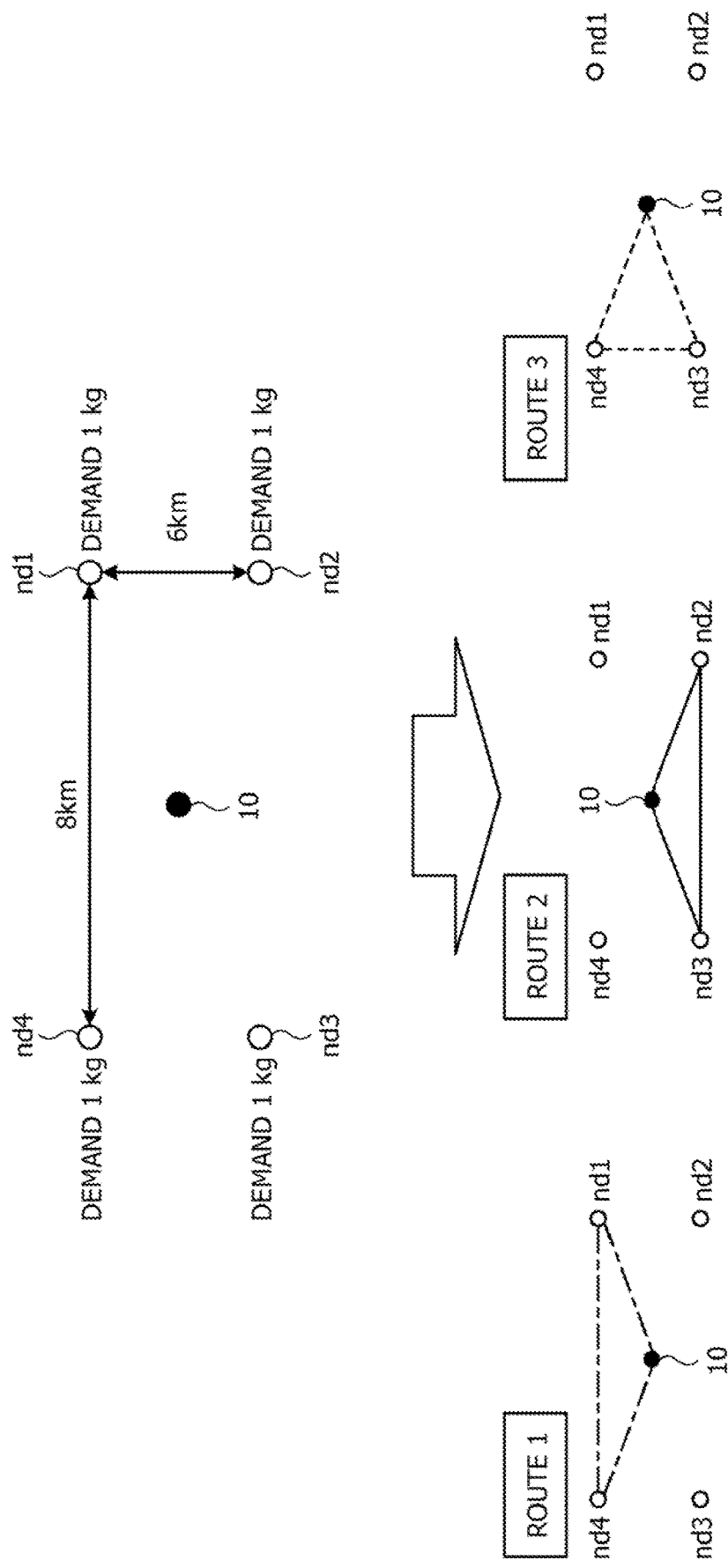
FIG. 8 is a diagram illustrating exemplary generation of a set of routes according to the first embodiment.

The generation of the set of routes in step S101 will be described in more detail. FIG. 8 is a diagram illustrating an example of the generation of the set of routes according to the first embodiment. In the example of FIG. 8, a set of routes that minimizes the cost of transport by the vehicle from one depot 10 to four nodes 1 to 4 (nd1 to nd4) each having demand of 1 kg is generated. Note that the cost of the vehicle is assumed to be a travel distance of the vehicle in the example of FIG. 8. Furthermore, the maximum loading capacity of the vehicle is assumed to be 2 kg. Accordingly, the number of nodes that the vehicle may visit in one transport is equal to or less than 2 (not including the depot), and for example, a set of routes of routes 1 to 3 is generated in a solution process as illustrated in the lower part of FIG. 8.

Returning to the descriptions of FIG. 7, next, the information processing device 100 solves a linearly relaxed problem of the "problem of selecting a set of routes that minimizes the total cost from the already generated route set" (step S102). Step S102 solves a dual problem of the linearly relaxed problem, and obtains a first index (hereinafter referred to as "reward") indicating which node the route to be generated next is to visit to lower the optimum value (hereinafter referred to as "approximation of the total cost") of the linearly relaxed problem.

The reward calculation in step S102 will be described in more detail. FIG. 9 is a diagram illustrating an example of the reward calculation according to the first embodiment. The example of FIG. 9 calculates a reward of each node from the set of routes of the routes 1 to 3 generated in FIG. 8. As illustrated in the upper part of FIG. 9, the costs of the routes 1 to 3 are assumed to be $c_1=18$ km, $c_2=18$ km, and $c_3=16$ km, respectively.

Furthermore, since the total cost is preferably minimized, the objective function to be minimized is $c_1x_1+c_2x_2+c_3x_3$ where $x_i$ is a variable representing whether to select the route i, as illustrated in the middle part of FIG. 9. Furthermore, since one or more routes to visit each node need to be selected, the constraint expressions for $x_i$ are $x_1 \geq 1$, $x_2 \geq 1$, $x_2+x_3 \geq 1$, and $x_1+x_3 \geq 1$. Furthermore, $x_1, x_2, x_3 \geq 0$ since $x_1$ to $x_3$ need to be real-valued.

Meanwhile, since the approximation of the total cost of the linearly relaxed problem may be lowered as the reward increases, as illustrated in the lower part of FIG. 9, the objective function to be maximized is $y_1+y_2+y_3+y_4$ where $y_j$ is a variable representing a reward of each node. Furthermore, the constraint expressions for $y_i$ are $y_1+y_4 \leq c_1=18$ km, $y_2+y_3 \leq c_2=18$ km, and $y_3+y_4 \leq c_3=16$ km from the individual costs of the routes 1 to 3. Furthermore, $y_1, y_2, y_3, y_4 \geq 0$ since $y_1$ to $y_4$ need to be real-valued. Then, $(y_1, y_2, y_3, y_4)=(18, 18, 0, 0)$ is the optimum solution when each value of $y_i$, which maximizes the value of the objective function $y_1+y_2+y_3+y_4$ while satisfying such constraint expressions for $y_i$, is obtained.

Note that, although the cost of the vehicle is assumed to be the travel distance of the vehicle in the examples of FIGS. 8 and 9, the cost of the vehicle may be the travel distance and the operation time of the vehicle as in the common VRP. In this case, for example, a value obtained by a function expressed by the following expression (3) is substituted for a cost $c_i$ of the route i.

[Expression 3]

$$\text{VEHICLE COST}=f(\text{VEHICLE TRAVEL DISTANCE,VEHICLE OPERATION TIME}), f(a,b): \text{FUNCTION OF } a,b \quad (3)$$

Returning to the descriptions of FIG. 7, next, the information processing device 100 finds a route that satisfies the VRP condition and lowers the approximation of the total cost on the basis of the index obtained in step S102, which is, the reward (step S103). If the route is found in step S103 (Yes in step S104), the information processing device 100 adds the route to the already generated route set (step S105), and returns to step S102 to repeat the process. On the other hand, if it is failed to find the route in step S103 (No in step S104), the route generation process illustrated in FIG. 7 is terminated. In step S103, a route with the minimum value of the reduced cost, which is a second index, is found as a route to be generated next. The reduced cost is obtained as (cost—sum of reward values of nodes to be visited). In step S103 as well, the process continues with the cost of the vehicle as the travel distance of the vehicle. Furthermore, when the obtained reward and each cost used in FIG. 9 are used, the route that starts from the depot 10, visits the node 1 and the node 2 in that order (or vice versa), and returns to the depot 10 has the minimum reduced cost with the reduced cost=16 (cost)−36 (sum of rewards)=−20. Accordingly, the problem is how to find such a route with the minimum reduced cost.

FIG. 10 is a diagram for explaining the algorithm of the shortest route search method for finding a route with the minimum reduced cost. The algorithm in FIG. 10 finds a route under the condition that the optimum route in the algorithm of the existing shortest route search method in FIG. 2 has the minimum reduced cost. Note that, in FIG. 10 as well, a part surrounded by a broken line indicates one iteration.

Figure 11:
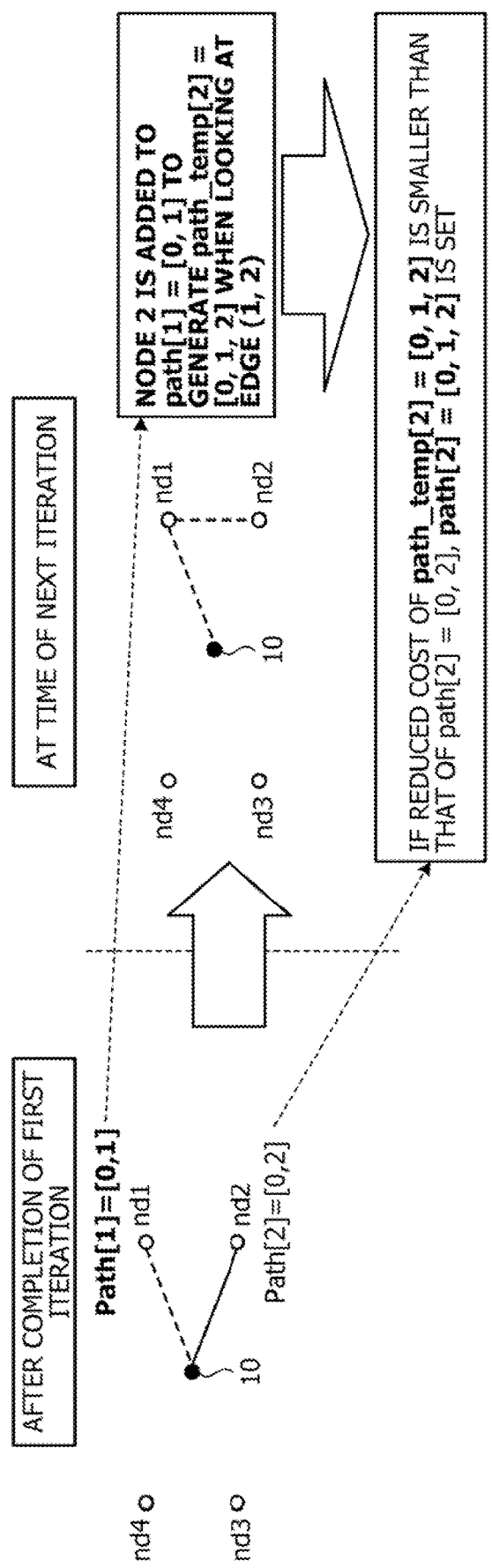
FIG. 11 is a diagram illustrating exemplary route generation using a shortest route search method according to the first embodiment.

The algorithm illustrated in FIG. 10 will be described with reference to FIG. 11. FIG. 11 is a diagram illustrating exemplary route generation using the shortest route search method according to the first embodiment. First, in the first iteration of the algorithm illustrated in FIG. 10, a route with the minimum reduced cost, which is a route from the depot 10 to each node, is found. The route illustrated on the left side of FIG. 11 is a route after the first iteration of the algorithm illustrated in FIG. 10 ends. As illustrated on the left side of FIG. 11, the route from the depot 10 to the node 1 and the route from the depot 10 to the node 2 in the first iteration of the algorithm illustrated in FIG. 10 with the reduced cost=5 (cost)−18 (sum of rewards)=−13 are found as routes with the minimum reduced cost. For example, as illustrated on the left side of FIG. 11, the routes are indicated as path[1]=[0, 1] and path[2]=[0, 2], respectively.

Then, as illustrated on the right side of FIG. 11, for example, the node 2 is added to the route (path[1]) from the depot 10 to the node 1 to generate path_temp[2]=[0, 1, 2] when looking at the edge (1, 2) from the node 1 to the node 2 in the next iteration. The route (path_temp[2]) through which the depot 10, the node 1, and the node 2 are sequentially visited is a route that starts from the depot 10 and arrives at the node 2 in a similar manner to the route (path[2]) from the depot 10 to the node 2. Accordingly, the reduced cost of path_temp[2] is calculated to compare it with the reduced cost of path[2], and if the reduced cost of path_temp[2] is smaller, the optimum route of the routes that arrive at the node 2 is updated from path[2] to path_temp[2]. For example, path[2]=[0, 1, 2]. The reduced cost=16 (cost)−36 (sum of rewards)=−20 is obtained when the reduced cost of path_temp[2] is actually calculated, which is smaller than the reduced cost −13 of path[2]. In this manner, in the iteration, the edge to the next node is added, the reduced cost of the generated route is compared with a reduced cost of another route that arrives at the same node, and the route with the smaller reduced cost is updated as the optimum route.

However, as illustrated in FIG. 10, the process in the iteration part repeats the process of sequentially scanning the edges between each of the nodes including the depot for the set of all edges, generating a route by adding an edge to the route, calculating and comparing the reduced cost, and updating the optimum route. Accordingly, when the number of nodes of the VRP increases, the processing time increases at a square rate by simple calculation. In view of the above, in the present disclosure, edges that have not contributed to the update of the optimum route equal to or more than a predetermined number of times are excluded from subsequent processing targets, thereby reducing the processing time.

FIG. 12 is a diagram for explaining the algorithm of the shortest route search method according to the first embodiment. In FIG. 12 as well, a part surrounded by a broken line indicates one iteration. As compared to the process in FIG. 10, the process in the iteration part in FIG. 12 counts the number of times of the case of not contributing to the update of the optimum route (else part of if), and the process is carried out only when the number of times is less than a predetermined threshold (Thres). Note that the value of the threshold and its conditions (whether it is equal to or less than or less than the threshold, etc.) may be optionally changed, and are not limited to the example of FIG. 12 and the like.

FIG. 13 is a diagram for explaining the exclusion of the edges that have not contributed to the route update according to the first embodiment. In the example of FIG. 13, the predetermined threshold is set to 1, and edges that have not contributed to the update of the optimum route one or more times are excluded from the subsequent processing. The left side of FIG. 13 illustrates edges to be scanned in each iteration, which is, edges to be processed. The right side of FIG. 13 illustrates routes generated by adding edges by the processing of the individual iteration parts. As illustrated on the left side of FIG. 13, in the third iteration, the edges that have not contributed to the update of the optimum route one or more times are excluded, and only four edges are scanned and processed. Note that the illustration of FIG. 13 is merely an example, and the obtained routes and the excluded edges may differ depending on the order in which the edges are scanned and processed in each iteration.

[Process Flow]

Figure 14A:
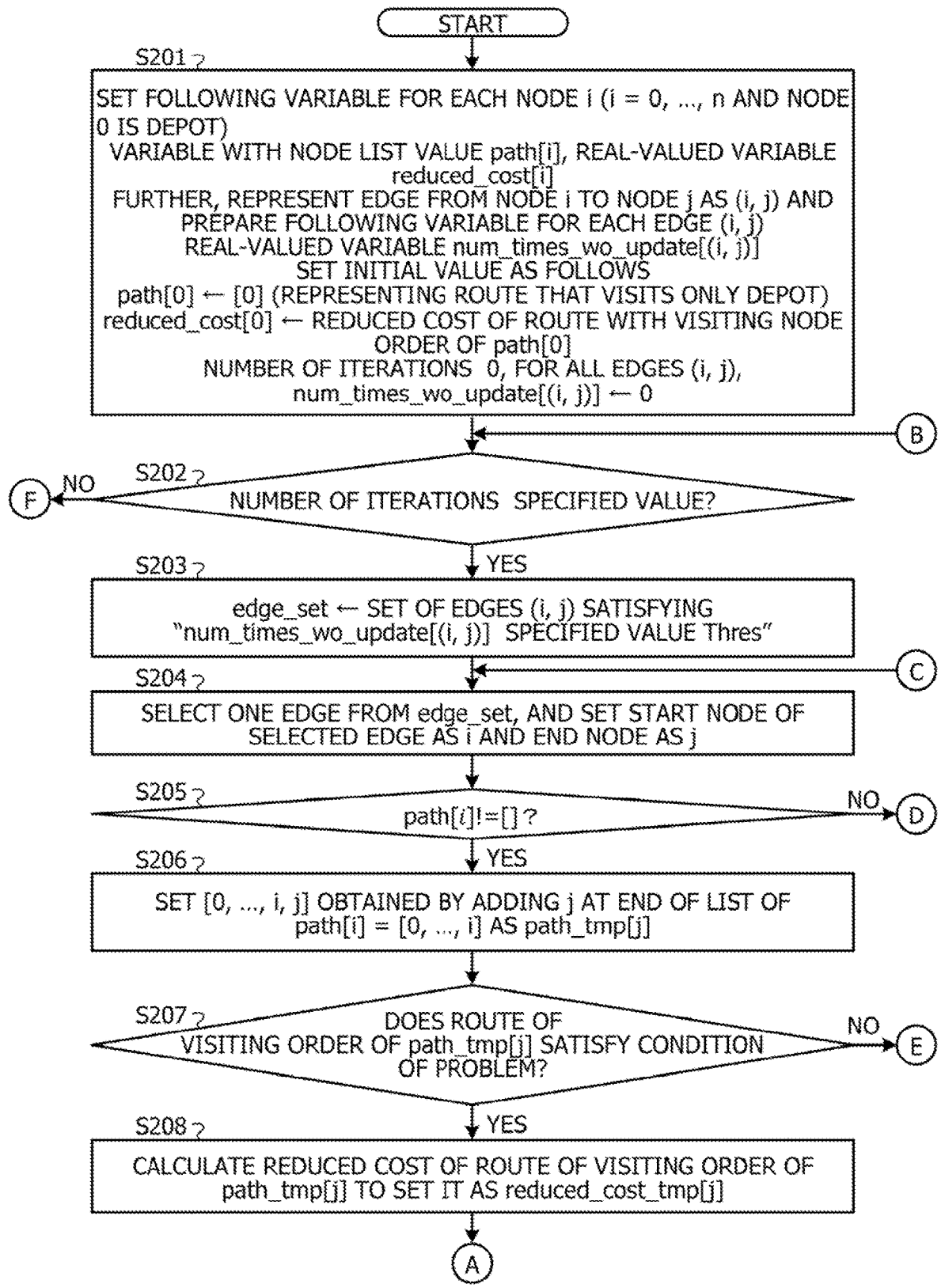
FIG. 14 (i.e., FIGS. 14A and 14B) is a flowchart illustrating an exemplary flow of an optimum route update process according to the first embodiment.
Figure 14B:
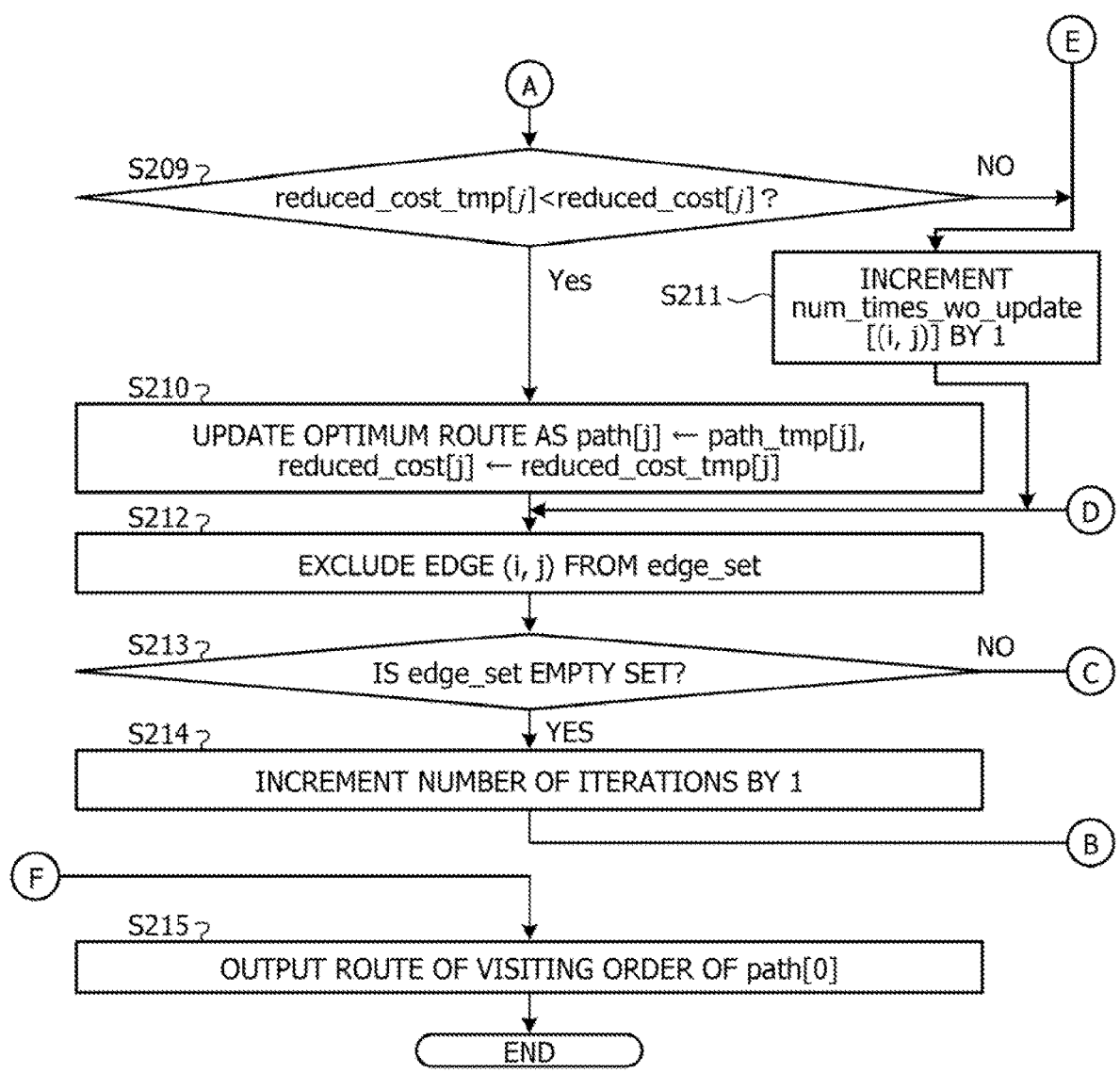

Next, a flow of an optimum route update process to be executed by the information processing device 100 will be described. FIG. 14 (i.e., FIGS. 14A and 14B) is a flowchart illustrating an exemplary flow of the optimum route update process according to the first embodiment. The optimum route update process illustrated in FIG. 14 illustrates the algorithm illustrated in FIG. 12 in more detail along the flow.

First, the information processing device 100 sets a variable for each node including the depot in the VRP (step S201). Step S201 is what is called initial value setting processing in a program. While the initial value settings for individual values are, for example, settings as illustrated in FIG. 14, they are not limited to these.

Next, the information processing device 100 determines whether the number of iterations is less than a predetermined threshold (step S202). Step S202 is for limiting the number of times of processing in the iteration part so that the processing in the iteration part illustrated in FIG. 12 is not infinitely repeated at least to such an extent that the processing of up to the generation of the route starting from the depot and returning to the depot again is repeated. If the number of iterations is equal to or more than the predetermined threshold (No in step S202), the route of the visiting order of path[0] is output (step S215), and the optimum route update process illustrated in FIG. 14 is terminated.

On the other hand, if the number of iterations is less than the predetermined threshold (Yes in step S202), the information processing device 100 sets the set of edges in which the number of times of not contributing to the update of the optimum route is less than the predetermined threshold (Thres) as a set of edges (edge_set) to be processed (step S203). Note that the number of times of not contributing to the update of the optimum route is stored in, for example, num_times_wo_update[(i, j)], and the initial value is 0 times.

Next, the information processing device 100 selects one edge from the set of edges set in step S203 (step S204). Note that, since step S204 is repeated processing in the iteration, the edge selected in step S204 is an edge that has not yet been selected from the set of edges set in step S203. Technically, since the edges that have already been processed in the subsequent processing are excluded from the set of edges, they are not subject to the selection in step S204.

Next, the information processing device 100 determines whether or not there is a route (path[i]) to which the edge selected in step S204 is added (step S205). Note that the route to which the edge selected in step S204 is added is, for example, a route (path[i]) that visits the start node i of the edge selected in step S204. If there is no route for adding (No in step S205), the process proceeds to step S212.

On the other hand, if there is a route for adding (Yes in step S205), the information processing device 100 adds the edge selected in step S204 to the route to generate a route (step S206). The generated route is set as path_tmp[j].

Next, the information processing device 100 determines whether the route (path_tmp[j]) generated by adding the edge in step S206 satisfies a predetermined condition of the VRP (step S207). Here, the predetermined condition of the VRP indicates, for example, various restrictions in the VRP, such as the maximum loading capacity of the vehicle, the amount of cargo that needs to be transported to each node, and the time period during which each node may be visited. If the predetermined condition is not satisfied (No in step S207), the information processing device 100 counts up the number of times (num_times_wo_update[(i, j)]) that the edge added in step S206 has not contributed to the update of the optimum route (step S211), and proceeds to step S212.

On the other hand, if the route generated by adding the edge in step S206 satisfies the predetermined condition of the VRP (Yes in step S207), the information processing device 100 calculates a reduced cost of the route (step S208). The calculated reduced cost is set as reduced_cost_tmp[j].

Next, the information processing device 100 compares the reduced cost (reduced_cost_tmp[j]) calculated in step S208 with a reduced cost (reduced_cost[j]) of the optimum route that arrives at the same node as the route generated by adding the edge in step S206 (step S209). If the reduced cost calculated in step S208 is smaller (No in step S209), the information processing device 100 counts up the number of times (num_times_wo_update[(i, j)]) that the edge added in step S206 has not contributed to the update of the optimum route (step S211). Then, after execution of step S211, the process proceeds to step S212.

On the other hand, if the reduced cost calculated in step S208 is larger (Yes in step S209), the information processing device 100 updates the optimum route (path[j]) to the route (path_tmp[j]) generated by adding the edge in step S206 (step S210). Furthermore, the information processing device 100 also updates the reduced cost (reduced_cost[j]) of the optimum route to the reduced cost (reduced_cost_tmp[j]) calculated in step S208.

Next, the information processing device 100 excludes the edge selected in step S204 from the set of edges (edge_set) to be processed (step S212).

Next, the information processing device 100 determines whether or not there is still an edge in the set of edges (edge_set) to be processed (step S213). If there is still an edge in the set of edges to be processed (No in step S213), the process returns to step S204 to select the next edge, and the process of steps S204 to S213 is repeated.

On the other hand, if there is no edge in the set of edges to be processed (Yes in step S213), the information processing device 100 counts up the number of iterations (step S214), returns to step S202, and repeats the process of steps S202 to S214 until the number of iterations becomes equal to or more than the predetermined threshold.

[Effects]

As described above, the information processing device 100 generates the plurality of first routes that satisfies the first condition out of the plurality of conditions included in the vehicle routing problem, calculates a reward of each node on the basis of the cost of each edge between each of the nodes of the first route, generates the second route that arrives at each node from the starting point and satisfies the second condition out of the plurality of conditions by combining the edges as an optimum route, generates the third route that satisfies the second condition by adding the edge to the second route, calculates a reduced cost of the second route and the third route on the basis of the cost and the reward, updates the optimum route to the third route when the reduced cost of the third route is smaller than the reduced cost of the second route that arrives at the same node as the third route, excludes the edge that has not contributed to the update of the optimum route equal to or more than the predetermined number of times from the targets to be added to each route, repeats the addition of the edge to the optimum route, the calculation of the reduced cost, and the update of the optimum route until the route returns to the starting point, and selects the route with the smallest reduced cost among the optimum routes that return to the starting point as a route candidate.

In this manner, the information processing device 100 is enabled to reduce the time needed to select the optimum route by excluding the edges that have not contributed to the update of the optimum route from the subsequent processing targets.

Furthermore, the information processing device 100 generates the plurality of first routes that satisfies the first condition out of the plurality of conditions included in the vehicle routing problem, calculates a reward of each node on the basis of the cost of each edge between each of the nodes of the first route, generates the second route that arrives at each node from the starting point and satisfies the second condition out of the plurality of conditions by combining the edges as an optimum route, generates the third route that satisfies the second condition by adding the edge to the second route, calculates a reduced cost of the second route and the third route on the basis of the cost and the reward, updates the optimum route to the third route with the smallest reduced cost out of the third routes when the reduced cost of the third route is smaller than the reduced cost of the second route that arrives at the same node as the third route, excludes the edge that has not contributed to the update of the optimum route equal to or more than the predetermined number of times from the targets to be added to each route, repeats the addition of the edge to the optimum route, the calculation of the reduced cost, and the update of the optimum route until the route returns to the starting point, and outputs the optimum route that returns to the starting point as a route candidate.

In this manner, the information processing device 100 is enabled to reduce the time needed to select the optimum route by excluding the edges that have not contributed to the update of the optimum route from the subsequent processing targets. Furthermore, the information processing device 100 retains the route with the smallest reduced cost as the optimum route, whereby the processing time may be reduced as compared with the case of continuing to retain routes other than the route with the smallest reduced cost.

[System]

A processing procedure, a control procedure, a specific name, and information including various types of data and parameters indicated in the descriptions above or in the drawings may be optionally changed unless otherwise specified. Furthermore, the specific examples, distributions, numerical values, and the like described in the embodiment are merely examples, and may be optionally changed.

Furthermore, each component of each device illustrated in the drawings is functionally conceptual, and is not necessarily physically configured as illustrated in the drawings. For example, specific forms of distribution and integration of individual devices are not limited to those illustrated in the drawings. For example, all or a part thereof may be configured by being functionally or physically distributed or integrated in any units depending on various types of loads, usage situations, or the like. Moreover, all or a part of individual processing functions performed in the individual devices may be implemented by a central processing unit (CPU), a graphics processing unit (GPU), and programs analyzed and executed by the CPU and the GPU, or may be implemented as hardware by wired logic.

[Hardware]

Figure 15:
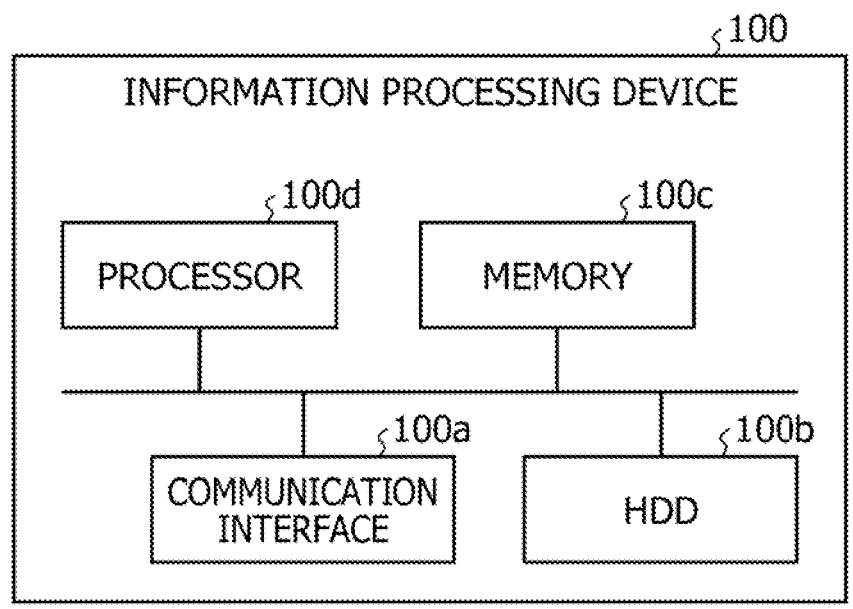
FIG. 15 is a diagram for explaining an exemplary hardware configuration of the information processing device 100.

FIG. 15 is a diagram for explaining an exemplary hardware configuration of the information processing device 100. As illustrated in FIG. 15, the information processing device 100 includes a communication interface 100a, a hard disk drive (HDD) 100b, a memory 100c, and a processor 100d. Furthermore, the individual units illustrated in FIG. 15 are mutually connected by a bus or the like.

The communication interface 100a is a network interface card or the like, and communicates with another server. The HDD 100b stores programs and databases (DBs) for operating the functions illustrated in FIG. 3.

The processor 100d is a hardware circuit that reads a program that executes processing similar to that of each processing unit illustrated in FIG. 3 from the HDD 100b or the like and loads it into the memory 100c to operate a process for implementing each function described with reference to FIG. 3 and the like. For example, this process implements a function similar to that of each processing unit included in the information processing device 100. For example, the processor 100*d* reads, from the HDD 100*b* or the like, a program having a function similar to that of the generation unit 141, the operation unit 142, or the like. Then, the processor 100*d* executes a process that performs processing similar to that of the generation unit 141, the operation unit 142, or the like.

In this manner, the information processing device 100 operates as an information processing device that executes operation control processing by reading and executing the program for performing processing similar to that of each processing unit illustrated in FIG. 3. Furthermore, the information processing device 100 may also implement functions similar to those of the embodiment described above by reading a program from a recording medium using a medium reading device and executing the read program. Note that other programs referred to in the embodiment are not limited to being executed by the information processing device 100. For example, the present disclosure may be similarly applied to a case where another information processing device executes the program or a case where the information processing device 100 and another information processing device cooperatively execute the program.

Furthermore, the program that performs processing similar to that of each processing unit illustrated in FIG. 3 may be distributed via a network such as the Internet. Furthermore, this program may be recorded in a computer-readable recording medium such as a hard disk, a flexible disk (FD), a compact disc read only memory (CD-ROM), a magneto-optical disk (MO), or a digital versatile disc (DVD), and may be executed by being read from the recording medium by a computer.

Second Embodiment

Meanwhile, while the embodiment of the present disclosure has been described above, the present disclosure may be implemented in various different modes in addition to the embodiment described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory, the processor being configured to perform processing including:
   generating a plurality of first routes that satisfies a first condition out of a plurality of conditions included in a vehicle routing problem;
   calculating a first index of each of nodes on a basis of a cost of each edge between each of the nodes of the first route;
   generating, as an optimum route, a second route that arrives at each of the nodes from a starting point and satisfies a second condition out of the plurality of conditions by combining the edge;
   generating a third route that satisfies the second condition by adding the edge to the second route;
   calculating, for each route of the second rote and the third route, a second index that is a difference between a total value of the first index and the cost of the each route;
   updating the optimum route when the second index of the third route is smaller than the second index of the second route that arrives at a same node as the third route;
   excluding the edge that has not contributed to the updating of the optimum route equal to or more than a predetermined number of times from a target to be added to each route; and
   outputting a route with the smallest second index as a route candidate by repeating the adding of the edge to the optimum route, the calculating of the second index, and the updating of the optimum route until the route returns to the starting point, wherein
   the first index includes an index that represents a degree of reduction of the cost in a linearly relaxed problem of the vehicle routing problem.

2. The information processing device according to claim 1, wherein
   the updating the optimum route includes updating the optimum route to the third route when the second index of the third route is smaller than the second index of the second route that arrives at the same node as the third route, and
   the outputting the route candidate includes selecting, as the route candidate, the route with the smallest second index out of the optimum route that returns to the starting point.

3. The information processing device according to claim 1, wherein
   the updating the optimum route includes updating the optimum route to the third route with the smallest second index out of the third route when the second index of the third route is smaller than the second index of the second route that arrives at the same node as the third route, and
   the outputting the route candidate includes outputting the optimum route that returns to the starting point as the route candidate.

4. A non-transitory computer-readable storage medium storing an information processing program for causing a computer to perform processing comprising:
   generating a plurality of first routes that satisfies a first condition out of a plurality of conditions included in a vehicle routing problem;
   calculating a first index of each of nodes on a basis of a cost of each edge between each of the nodes of the first route;
   generating, as an optimum route, a second route that arrives at each of the nodes from a starting point and satisfies a second condition out of the plurality of conditions by combining the edge;
   generating a third route that satisfies the second condition by adding the edge to the second route;
   calculating, for each route of the second rote and the third route, a second index that is a difference between a total value of the first index and the cost of the each route;
   updating the optimum route when the second index of the third route is smaller than the second index of the second route that arrives at a same node as the third route;
   excluding the edge that has not contributed to the updating of the optimum route equal to or more than a predetermined number of times from a target to be added to each route; and outputting a route with the smallest second index as a route candidate by repeating the adding of the edge to the optimum route, the calculating of the second index, and the updating of the optimum route until the route returns to the starting point, wherein the first index includes an index that represents a degree of reduction of the cost in a linearly relaxed problem of the vehicle routing problem.

5. The non-transitory computer-readable storage medium according to claim 4, wherein the updating the optimum route includes updating the optimum route to the third route when the second index of the third route is smaller than the second index of the second route that arrives at the same node as the third route, and the outputting the route candidate includes selecting, as the route candidate, the route with the smallest second index out of the optimum route that returns to the starting point.

6. The non-transitory computer-readable storage medium according to claim 4, wherein the updating the optimum route includes updating the optimum route to the third route with the smallest second index out of the third route when the second index of the third route is smaller than the second index of the second route that arrives at the same node as the third route, and the outputting the route candidate includes outputting the optimum route that returns to the starting point as the route candidate.

7. An information processing method implemented by a computer, the information processing method comprising:

generating a plurality of first routes that satisfies a first condition out of a plurality of conditions included in a vehicle routing problem;

calculating a first index of each of nodes on a basis of a cost of each edge between each of the nodes of the first route;

generating, as an optimum route, a second route that arrives at each of the nodes from a starting point and satisfies a second condition out of the plurality of conditions by combining the edge;

generating a third route that satisfies the second condition by adding the edge to the second route;

calculating, for each route of the second rote and the third route, a second index that is a difference between a total value of the first index and the cost of the each route;

updating the optimum route when the second index of the third route is smaller than the second index of the second route that arrives at a same node as the third route;

excluding the edge that has not contributed to the updating of the optimum route equal to or more than a predetermined number of times from a target to be added to each route; and outputting a route with the smallest second index as a route candidate by repeating the adding of the edge to the optimum route, the calculating of the second index, and the updating of the optimum route until the route returns to the starting point, wherein the first index includes an index that represents a degree of reduction of the cost in a linearly relaxed problem of the vehicle routing problem.

8. The information processing method according to claim 7, wherein the updating the optimum route includes updating the optimum route to the third route when the second index of the third route is smaller than the second index of the second route that arrives at the same node as the third route, and the outputting the route candidate includes selecting, as the route candidate, the route with the smallest second index out of the optimum route that returns to the starting point.

9. The information processing method according to claim 7, wherein the updating the optimum route includes updating the optimum route to the third route with the smallest second index out of the third route when the second index of the third route is smaller than the second index of the second route that arrives at the same node as the third route, and the outputting the route candidate includes outputting the optimum route that returns to the starting point as the route candidate.

* * * * *